United States Patent [19]

Beugin

[11] Patent Number: 4,619,432

[45] Date of Patent: Oct. 28, 1986

[54] DEVICE FOR RAPIDLY MOUNTING A BASE PLATE ON A CHASSIS

[75] Inventor: Michel P. Beugin, Flers, France

[73] Assignee: U.S. Philips Corporation, New York, N.Y.

[21] Appl. No.: 737,015

[22] Filed: May 23, 1985

[30] Foreign Application Priority Data

May 29, 1984 [FR] France ............................ 84 08389

[51] Int. Cl.⁴ ............................................ F16F 15/08
[52] U.S. Cl. ................................... 248/635; 248/349; 411/508
[58] Field of Search .............. 411/108, 111, 112, 182, 411/508, 509, 510; 248/349, 631, 632, 634, 635, 639

[56] References Cited

U.S. PATENT DOCUMENTS

| | | | |
|---|---|---|---|
| 1,865,866 | 7/1932 | Lee | 411/493 X |
| 1,876,640 | 9/1932 | Dorson | 248/635 |
| 2,520,757 | 8/1950 | Cain | 248/632 |
| 3,126,039 | 3/1964 | Fiddler | 411/112 |
| 3,221,572 | 12/1965 | Swick | 411/508 X |
| 3,393,431 | 7/1968 | Saunders | 411/508 |
| 3,783,922 | 1/1974 | Peirus | 411/111 |
| 4,133,246 | 1/1969 | Small | 411/182 |
| 4,358,234 | 11/1982 | Takegawa et al. | 411/182 |
| 4,521,148 | 6/1985 | Tanaka | 411/182 |

FOREIGN PATENT DOCUMENTS 845891 8/1960 United Kingdom ............... 248/634
970172 9/1964 United Kingdom .

Primary Examiner—Thomas J. Holko
Attorney, Agent, or Firm—Robert T. Mayer

[57] ABSTRACT

A device for rapidly mounting a plate (P) on a chassis (C) comprises flexible displaceable arms (4), formed by a single piece of moulded synthetic resin (1). The piece has a lateral opening for inserting a damping element (5) of rubber. The assembly can no longer be dismounted when a connecting piece (6) of suitable diameter is inserted.

2 Claims, 4 Drawing Figures

DEVICE FOR RAPIDLY MOUNTING A BASE PLATE ON A CHASSIS

The invention relates to a device for rapidly mounting a base plate on a chassis comprising a mounting element adapted to bear in a hole of the chassis by vertically penetrating into it in the downward direction. A securing element passes through the mounting element for holding the mounting element on the base plate flexible, radial arms deflect radially when the device penetrates into the hole of the chassis and come out radially after the vertical penetration for locking the plate on the chassis.

Such a device is employed by manufacturers of turntables. The manufacturer of the turntable plates is often not the manufacturer of a record player or a hi-fi electronic circuit so that it is interesting to be in a position of providing a plate readily mountable on the chassis, which generally comprises the audiopart of the record player or of the electronic circuit.

A known device for rapid mounting is disclosed in British Pat. No. 741,308. This known device has various disadvantages. The device is expensive due to the number of required component parts. Moreover, the use of a conical helical spring does not ensure a uniform support of the plate on the chassis, since the turns are not sufficiently flat, parallel or concentric. It is, therefore, necessary to provide a control-member for the height of the plate. It is furthermore necessary to provide a locking system for the plate on the chassis in order to avoid the effect of shocks produced during transport of the apparatus. Such shipping takes place after mounting and the locking system is necessary because the lateral positioning obtained by the helical springs is not sufficient.

The present invention has for its object to obviate these disadvantages.

According to the invention a device for rapid mounting is characterized in that the mounting element and the flexible arms are integrated in a single piece of synthetic resin substantially having the shape of a cup with lateral incisions for providing flexibility to the arms.

Since the synthetic resin is not very rigid material it is possible, for example, by moulding gaps in the wall of the mounting element to form flexible arms. The flexibility of each arm is controlled by the size of the section of the arm.

The cup has a hole for fixing it to the plate by means of known axial means.

During mounting of the plate on the chassis the centering of the cup in the hole of the chassis is ensured by the general concentricity inherent in pieces formed by moulding.

The free end of each arm is a chamfered profile in order to ensure satisfactory clamping of the chassis between an upper shoulder of the cup and the end of an arm, when the assembly is mounted. Preferably a plate has three cups simultaneously engaging the chassis during the rapid mounting operation.

It is interesting to note that the mounting device comprises an anti-vibration damping element of rubber having substantially the shape of a tube with a slot on its outer surface.

A further advantage of the present invention resides in that the mounting element has in its end an opening adjoining a further opening in the side wall of the cup for radially inserting the rubber damping element.

In order to prevent the damping element, after mounting in the cup from escaping radially out of the cup, the invention provides a tubular connecting piece arranged around the axis in the interior of the damping element. Therefore, with the respective diameters of the connecting piece and the damping conduit and with the dimension of the opening of the cup it is no longer possible for the damping element to get out as long as the connecting piece is present. The connecting piece is fixed to the plate by known means.

The invention will be set out with reference to a non-limiting example shown in the accompanying drawing.

Figure 1:
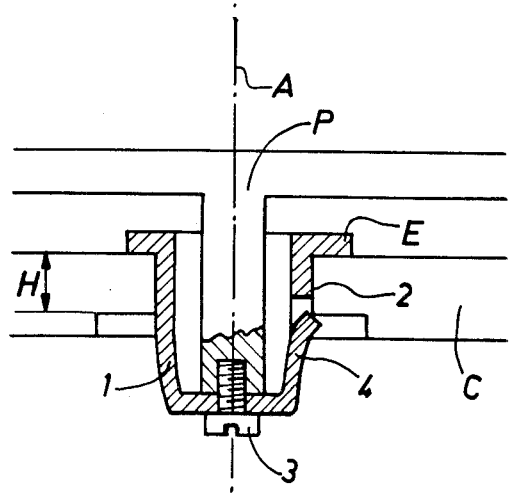
FIG. 1 is a vertical sectional view of a mounting device after being mounted.

Referring to FIG. 1, plate P is mounted on a chassis C. The rapid mounting device 1 is fixed to the plate by a screw 3, as a securing means, and has in general the shape of a cup having an axis A. The cup has a outwardly extending shoulder or lip E on its upper end and one or more radially flexible arms 4 formed on its outer surface. The chassis C has a circular opening 2, the diameter and the height (H) of which are adapted to receive the cup. The cup penetrates vertically downwardly when the plate P is being mounted on the chassis C. At the beginning of the mounting operation the arms 4 radially deflect to obtain, at the end of the operation, the positions shown in which the cup and the chassis are united.

Figure 2:
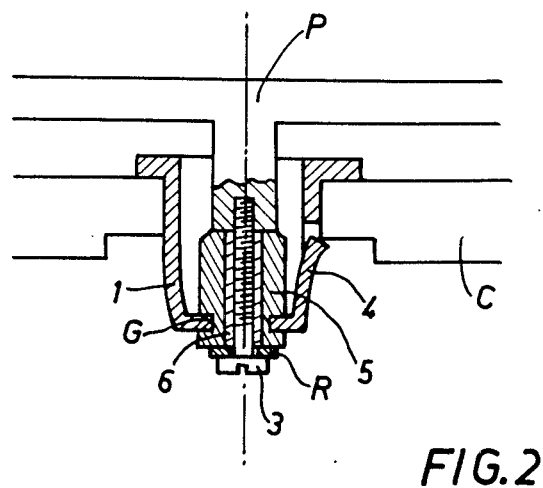
FIG. 2 is a simular sectional view of a mounting device comprising a damping element and a connecting piece after mounting.

The rapid mounting device shown in FIG. 2 comprises, apart from the cup 1, a damping element 5. In the case of a turntable plate it is important that any vibrations of the chassis C should not be mechanically transmitted to the plate P. The damping element 5 is usually made from rubber, an anti-vibration material having substantially the shape of a tube having an outer slot G in order to be supported by the cup. The plate is supported by the top face of the damping element 5. According to the invention the damping element is radially introduced into the cup through an opening provided for this purpose.

Figure 3:
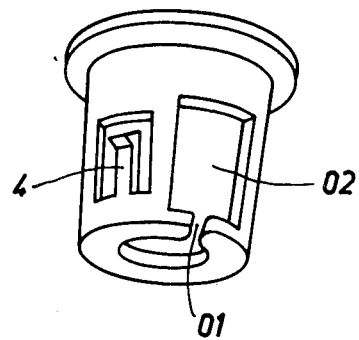
FIG. 3 is a plan view of the mounting device in the form of a cup with its openings.

In FIG. 3, a plan view of the cup, said opening is clearly visible. It is formed by a first opening O1 in the lower supporting face of the cup for engaging the slot of the damping element and by a second opening O2 in the side wall of the cup. These two openings are joined as is shown in FIG. 3 for the radial introduction of the damping element. This radial introduction is much more practical than the axial introduction. In the conventional, known manner in order to maintain the damping element on the plate P a screw 3 and a washer R are shown in FIG. 2. FIG. 3 also shows by way of example an arm 4 with the surrounding incisions for providing the required flexibility.

Figure 4:
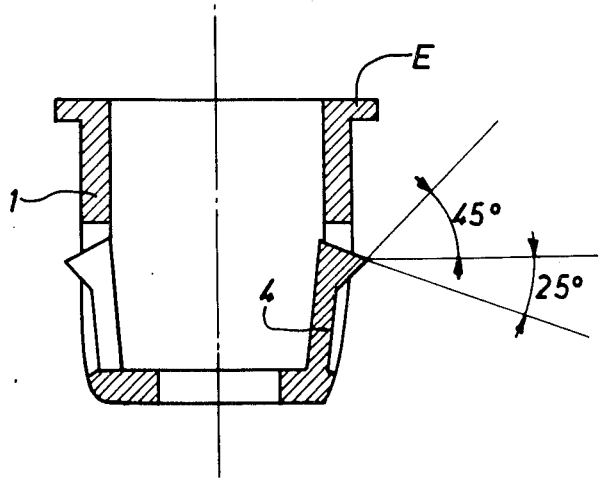
FIG. 4 is a sectional view of a cup.

As is shown in FIG. 4, a sectional view of a Delrin cup at the scale 2, arm section of 1.2×5 or 6 sq. mms provides satisfactory flexibility. In a preferred embodiment two arms are diametrically opposed to one another. The angle of 45° shown ensures a satisfactory deflection of the arm and the angle of 25° provides a satisfactory clamping of the cup in the chassis.

FIG. 2 furthermore shows a connecting piece 6. This connecting piece 6 in the form of a tube has a first known function of allowing tightening of the screw 3 without influencing the damping element 5, which thus maintains some axial freedom in order to normally fulfil its damping function. According to the invention the connecting piece 6 has a second function in preventing a radial extraction of the damping element through the opening mentioned above in the flange of the cup for introducing the damping element. The external diameter of the connecting piece 6 is such that after having passed through the passage O1 (FIG. 3) it cannot get out after mounting.

In the described embodiment of the invention the damping element is first radially inserted into the cup and then the blocking connecting piece is introduced into the damping element and finally the washer and the screw are disposed for maintaining the assembly on the plate. The plate thus equipped can be rapidly mounted on a chassis by a simple, vertical insertion without the need for any further mounting operation. Each plate usually comprises three rapid mounting devices corresponding to the number of required fixing points to ensure a satisfactory seat of the plate on the chassis.

What is claimed is:

1. A bracket for rapidly mounting a base plate on a chassis with an aperture comprised of
    (a) a cup-shaped mounting element adapted to fit into said aperture, said mounting element having an outwardly extending lip at its upper end, a cylindrical surface and a bottom with an opening therein forming a bottom rim,
    said mounting element having both an opening and at least one radially extending flexible arm formed in its cylindrical surface,
    a gap in said bottom and in said cylindrical surface joining said opening in said cylindrical surface with said opening in said bottom,
    (b) an elastic damping element having a slot in its outer surface, and having an elongated hollow tubular shape, part of said damping element being located within said mounting element,
    said bottom rim being engaged in said slot of said damping element whereby said damping element is held in place by said mounting element; and
    (c) a securing means passing through said opening in said bottom of the mounting element and through said damping element into said base plate for attaching said mounting element to said base plate whereby when properly so attached said mounting element is secured to said chassis through the pressure exerted thereon in opposite directions by said lip and said radially extending arm.

2. A bracket for rapidly mounting a base plate on a chassis with an aperture comprised of
    (a) a cup-shaped mounting element adapted to fit into said aperture, said mounting element having an outwardly extending lip at its upper end, a cylindrical surface and a bottom with an opening therein forming a bottom rim,
    said mounting element having both an opening and at least one radially extending flexible arm formed in its cylindrical surface,
    a gap in said bottom and in said cylindrical surface joining said opening in said cylindrical surface with said opening in said bottom,
    (b) an elastic damping element having a slot in its outer surface, having an elongated hollow tubular shape, and having a predetermined height, part of said damping element being located within said mounting element,
    said bottom rim being engaged in said slot of said damping element whereby said damping element is held in place by said mounting element;
    (c) a rigid tubular connecting piece having a diameter greater than the fixed width of said gap in said bottom, and having a height substantially equal to said predetermined height of said damping element, said connecting piece located within said damping element; and
    (d) a securing means passing through said opening in said bottom of the mounting element and through said connecting piece into said base plate for attaching said mounting element to said base plate;
    whereby when properly so attached said mounting element is secured to said chassis through the pressure exerted thereon in opposite directions by said lip and said radially extending arm, and said connecting piece allows the tightening of said securing means without influencing the elastic capability of the damping element and without allowing radial extraction of said damping element.

* * * * *